United States Patent
Lenneman et al.

(10) Patent No.: US 11,260,907 B2
(45) Date of Patent: Mar. 1, 2022

(54) SYSTEMS AND METHODS FOR IMPROVING LANE CENTERING PERFORMANCE

(71) Applicant: Toyota Motor Engineering & Manufacturing North America, Inc., Plano, TX (US)

(72) Inventors: John K. Lenneman, Okemos, MI (US); Joshua E. Domeyer, Madison, WI (US); Benjamin P. Austin, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 296 days.

(21) Appl. No.: 16/261,697

(22) Filed: Jan. 30, 2019

(65) Prior Publication Data
US 2020/0239071 A1 Jul. 30, 2020

(51) Int. Cl.
*B62D 15/02* (2006.01)

(52) U.S. Cl.
CPC ......... *B62D 15/025* (2013.01); *B62D 15/029* (2013.01)

(58) Field of Classification Search
CPC .......... B62D 1/28; B62D 15/00; B62D 15/02; B62D 15/025; B62D 15/029; B60W 60/005; B60W 60/0053; B60W 30/12
See application file for complete search history.

(56) References Cited

U.S. PATENT DOCUMENTS

| 9,870,001 | B1* | 1/2018 | Mangal | B60W 50/08 |
|---|---|---|---|---|
| 2012/0283912 | A1* | 11/2012 | Lee | B62D 15/025 |
| | | | | 701/41 |
| 2013/0231830 | A1* | 9/2013 | Van Dan Elzen | B60W 10/04 |
| | | | | 701/42 |
| 2015/0284008 | A1 | 10/2015 | Tan et al. | |
| 2016/0001781 | A1* | 1/2016 | Fung | B60K 28/02 |
| | | | | 701/36 |

(Continued)

OTHER PUBLICATIONS

Lee et al., "Driving Simulation for Evaluation of Drive Assistance Systems and Driving Management Systems," DSC 2007 North America—Iowa City, p. 1-9 (2007).

(Continued)

*Primary Examiner* — Khoi H Tran
*Assistant Examiner* — Sarah A Tran
(74) *Attorney, Agent, or Firm* — Christopher G. Darrow; Darrow Mustafa PC (57) ABSTRACT

System, methods, and other embodiments described herein relate to improving lane centering performance of an operator of a vehicle after transitioning from an automated mode of operation to a manual mode of operation. In one embodiment, a method includes, in response to detecting a transition to the manual mode of operation, modifying a sensitivity level of a lane positioning system from a first value to a second value to induce finer path following by the operator. The method includes controlling the lane positioning system according to the sensitivity level. The method also includes resetting the sensitivity level to the first value upon determining that a deviation score satisfies a stability threshold. The deviation score characterizes deviations of the vehicle from a centerline resulting from operator control inputs.

21 Claims, 5 Drawing Sheets

(56) References Cited

U.S. PATENT DOCUMENTS

2016/0221575 A1     8/2016  Posch et al.
2020/0108867 A1*    4/2020  Eom ..................... B60W 30/12

OTHER PUBLICATIONS

Lundgren et al., "Evaluation of Safety Effects of Driver Assistance Systems Through Traffic Simulation," Transportation Research Record Journal of the Transportation Research Board, p. 1-14 (2006).
Mas et al., "Lateral Control Assistance and Driver Behavior in Emergency Situations," 3rd International Conference on Road Safety and Simulation, p. 1-12 (2011).

* cited by examiner

SYSTEMS AND METHODS FOR IMPROVING LANE CENTERING PERFORMANCE

TECHNICAL FIELD

The subject matter described herein relates in general to systems and methods for improving the lane centering performance of at least a vehicle with some form of driving automation system, and, more particularly, to modify an automated lane positioning system until the steering of an operator satisfies a threshold.

BACKGROUND

Advanced driver-assistance systems (ADAS) are systems developed to help an operator perform the driving task while promoting a safer and more enjoyable driving experience. As the level of driving automation increases, more of the driving task is performed by the vehicle. For example, a vehicle with a driving automation system operating according to the Society of Automotive Engineers (SAE) Level 1 classification requires at least one advanced driver-assistance feature that controls steering or acceleration/deceleration, e.g., lane keeping assistance systems, adaptive cruise control, parking assistance, etc. For SAE Level 2 classification, a vehicle with a driving automation system needs one or more driver assistance systems providing both steering and acceleration/deceleration. Along the driving automation continuum to full automation, i.e., SAE Level 5, the operator can delegate more of the driving task to the driving automation and allow it to control the vehicle. For example, SAE Level 3 may allow for taking the "eyes off" the road, meaning that the operator can take their hands off the wheel and attend to other matters so long as the operator intervenes within some limited time period when called upon by the vehicle to do so. Furthermore, SAE Level 4 may allow for taking the "mind off" the road, that is, the operator attention is not required as a fallback for safety and the operator may, e.g., fall asleep.

When operating a vehicle under some level of automation, whether the operator should be ready to take control or the operator optionally takes control of the vehicle, at some point, a transition from automated steering control to manual control by the operator may occur. Moreover, a phenomenon associated with driving automation systems exists where the operator's ability to control the vehicle is diminished after the transition to manual control. The diminished ability may manifest as small decreases in lateral (side-to-side) steering control ability after transitioning to manual control. Thus, there is a need to provide a safety mechanism to counter potential negative effects of transitioning from automated steering control to manual steering control.

SUMMARY

Example systems and methods are disclosed herein that relate to a manner of improving the lateral control ability of an operator after transitioning from an automated control state (hereinafter referred to as "automated mode," as set forth below) to a manual control state (hereinafter referred to as "manual mode," as set forth below). Lateral control ability, in the context of operating a vehicle and as used herein, refers to the capacity of the operator to maintain a centerline along a path of travel after transitioning to a manual mode. The path may be a lane, an offset within a lane, a trajectory along a roadway not defined by lane markers, etc. Vehicle lateral movement may be monitored over a travel time and/or distance to access the lateral control ability of the operator while in a manual mode.

Vehicles having driver assist systems that automatically maintain the centerline along the lane of travel may have an effect on the lateral control ability of the operator after the transition to the manual mode. Accordingly, in one embodiment, a disclosed centering system is implemented in a vehicle to improve lane centering performance along the path of travel of the operator. The centering system, for example, provides an elevated level of sensitivity to deviations of the vehicle from the centerline of the path that is personalized to each operator. The elevated sensitivity level may allow for a length of time for the operator to ramp up to normal manual control ability. Therefore, in one or more arrangements, the centering system accounts for temporary degradations in the lane centering performance as a result of using vehicle systems that provide automated steering.

In one embodiment, a centering system for improving lane centering performance of an operator of a vehicle after transitioning from an automated mode of operation to a manual mode of operation is disclosed. The centering system includes one or more processors and a memory that is communicably coupled to the one or more processors. The memory stores an inducement module including instructions that when executed by the one or more processors cause the one or more processors to modify, in response to detecting a transition to the manual mode of operation, a sensitivity level of a lane positioning system from a first value to a second value to induce finer path following by the operator. The memory stores a centering module including instructions that when executed by the one or more processors cause the one or more processors to control the lane positioning system according to the sensitivity level. Further, the memory stores a reset module including instructions that when executed by the one or more processors cause the one or more processors to reset the sensitivity level to the first value upon determining that a deviation score satisfies a stability threshold. The deviation score characterizes deviations of the vehicle from a centerline resulting from operator control inputs.

In one embodiment, a method for improving lane centering performance of an operator of a vehicle after transitioning from an automated mode of operation to a manual mode of operation is disclosed. The method includes, in response to detecting a transition to the manual mode of operation, modifying a sensitivity level of a lane positioning system from a first value to a second value to induce finer path following by the operator. The method includes controlling the lane positioning system according to the sensitivity level. The method also includes resetting the sensitivity level to the first value upon determining that a deviation score satisfies a stability threshold. The deviation score characterizes deviations of the vehicle from a centerline resulting from operator control inputs.

In one embodiment, a non-transitory computer-readable medium for improving lane centering performance of an operator of a vehicle after transitioning from an automated mode of operation to a manual mode of operation is disclosed. The non-transitory computer-readable medium stores instructions that when executed by one or more processors cause the one or more processors to perform the disclosed functions. The instructions include instructions to modify, in response to detecting a transition to the manual mode of operation, a sensitivity level of a lane positioning system from a first value to a second value to induce finer path following by the operator. The instructions include instructions to control a lane positioning system according to the sensitivity level. The instructions include instructions to reset the sensitivity level to the first value upon determining that a deviation score satisfies a stability threshold. The deviation score characterizes deviations of the vehicle from a centerline resulting from operator control inputs.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with improving lane centering performance of an operator is disclosed. As mentioned earlier, a phenomenon of decreased lateral steering control can occur after transitioning from an automated mode to a manual mode of operation. This disclosure presents systems and methods that address decreased lateral control during handover to manual control to improve the lane centering of the operator.

Accordingly, in one embodiment, a centering system modifies internal parameters of a lane positioning system to induce finer path following by the operator. For example, in one embodiment, the centering system modifies a sensitivity level value of the lane position system resulting in maintaining the vehicle along a centerline of a current lane of travel more strictly as compared to functioning of the lane positioning system otherwise (e.g., prior to sensitizing the lane positioning system on the occurrence of the handover). Additionally, or in the alternative, the centering system, in one arrangement, modifies a value of the sensitivity level resulting in generating a warning signal that alerts the operator of excessive vehicle deviations from the centerline sooner as compared to a prior value of the sensitivity level used before the modification.

Furthermore, in one embodiment, the centering system considers past lane centering performance of a specific operator when calculating a sensitivity level value used to modify the lane positioning system. That is, the centering system, in one embodiment, calculates the sensitivity level value according to how often and to what extent the specific operator deviated from a centerline along a path of travel in the past while in the manual mode. By incorporating past lane centering performance, the calculation of the sensitivity level value may filter out historical lane centering performance of the operator in the manual mode so that the calculation is directed to the lateral control ability after transitioning from automated steering to the manual mode. To further concentrate on lateral steering control, the centering system, in other arrangements, may incorporate past lane centering performance associated with various inclement weather conditions or a time of day. The centering system may incorporate past lane centering performance associated with roadway conditions, for example, driving in construction, driving in congested and non-congested traffic, etc. Incorporating this additional information informs the system about any biasing due to these conditions.

Additionally, in one arrangement, the centering system may extend controlling the lane positioning system according to a modified sensitivity level value. Thus, depending on how long the vehicle was in automated mode prior to transitioning to the manual mode, the system may operate under heightened sensitivity for different lengths of time. In another embodiment, the age of the operator may factor into a modified sensitivity level value calculation (e.g., an extent to which the sensitivity level is adjusted/heightened).

In either case, the centering system leverages past lane centering performance under varying conditions and current lateral control ability to facilitate maintaining a current path position after the operator transitions to the manual mode. In this way, the centering system improves the lane centering performance after handovers by controlling, for example, the lane positioning system until the operator is able to satisfy a specific stability threshold. In other words, the centering system improves the lane centering performance by decreasing the range in which the vehicle 100 is able to laterally move along the path of travel until the operator is able to satisfy a stability threshold.

Figure 1:
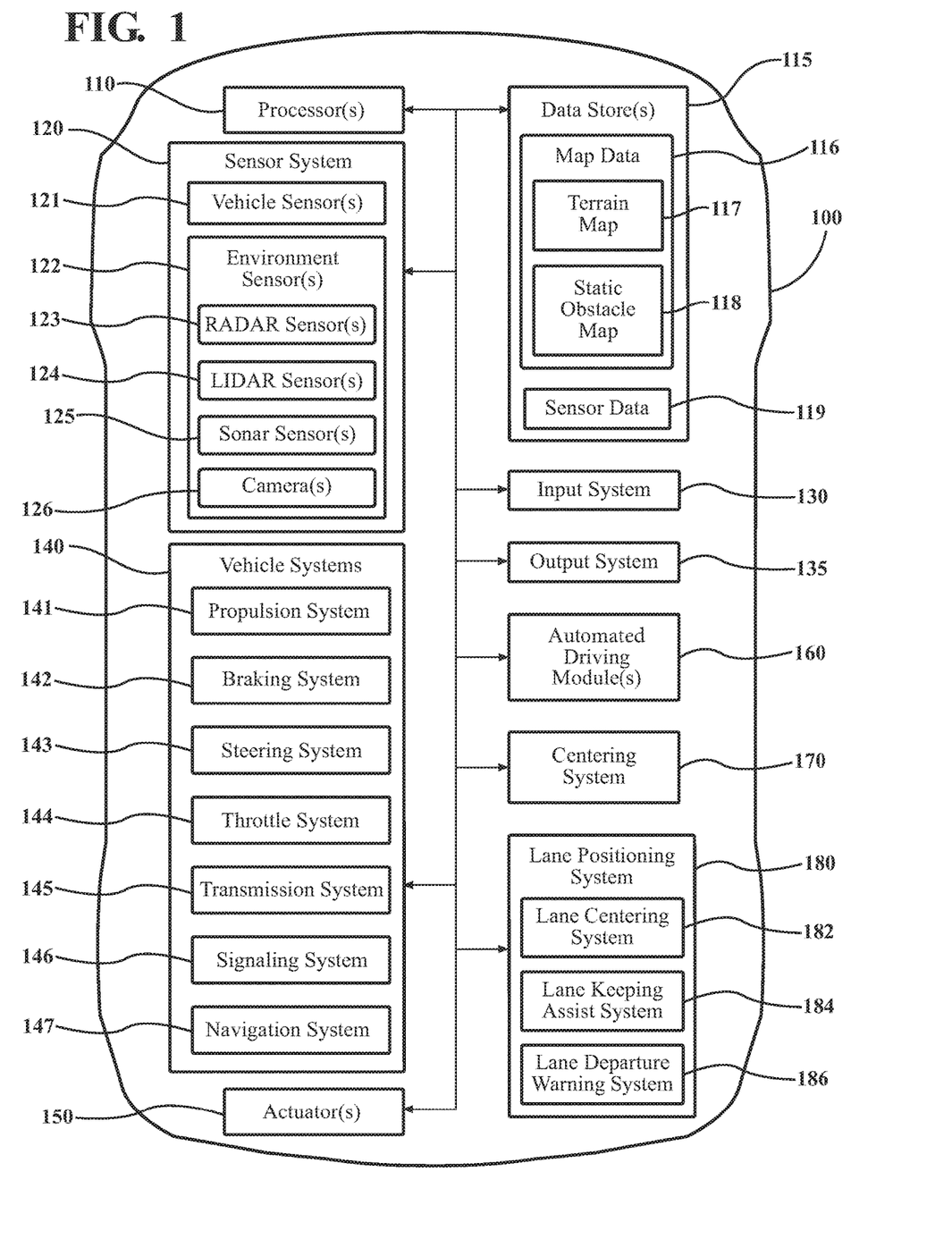
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the systems and methods as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

According to arrangements herein, the vehicle 100 can be an automated vehicle. As used herein, "automated vehicle" means a vehicle that is configured to operate in an automated mode. "automated mode" means that one or more computing systems are used to navigate and/or maneuver the vehicle 100 along a travel route with minimal or no input from a human operator. Furthermore, the automated mode may include automated steering. As used herein, "automated steering" means that one or more computing systems are used to steer the vehicle 100 along a travel route with no input from a human operator.

The vehicle 100 can have a plurality of operational modes. For instance, the vehicle 100 can have an unmonitored automated mode. "Unmonitored automated mode" means that one or more computing systems are used to navigate and/or maneuver the vehicle 100 along a travel route with no input or supervision required from a human operator. As an example, the unmonitored automated mode can include Level 4 (L4), as defined by the SAE International's J3016 Standard: Taxonomy and Definitions for Terms Related to Driving Automation Systems for On-Road Motor Vehicles (June 2018) ("SAE J3016 Standard"), which is incorporated herein by reference. The vehicle 100 can have a monitored automated mode. "Monitored automated mode" means that one or more computing systems are used to navigate and/or maneuver the vehicle 100 with at least some human operator receptiveness to alerts by the computing systems. As an example, the monitored automated mode can include Level 3 or L3, as defined by the SAE J3016 Standard. In some instances, when the vehicle 100 is in the monitored automated mode, a signal (e.g., an audial signal, a visual signal, a haptic signal, etc.) can be presented to a human operator to take an action within a predetermined amount of time. If such action is not taken within the predetermined amount of time, one or more safety maneuvers can be implemented.

The vehicle 100 can have one or more semi-automated modes. "Semi-automated mode" means that a portion of the navigation and/or maneuvering of the vehicle 100 along a travel route is performed by one or more computing systems, and a portion of the navigation and/or maneuvering of the vehicle 100 along a travel route is performed by a human operator. As an example, the semi-automated mode can include Level 2 (L2—both steering and acceleration/deceleration control by a driver assistance system) and/or Level 1 (L1—either steering or acceleration/deceleration control by a driver assistance system), as defined by the SAE J3016 Standard. One example of the semi-automated mode is when a lane centering system is activated. In such case, the position of the vehicle 100 may be automatically maintained along the centerline of a travel lane, but contact between hand and wheel may be used to confirm that a human operator is ready to intervene. Upon receiving a driver input to alter the travel lane (e.g. by signaling and merging onto an exit ramp from the highway), the lane centering system is deactivated. The semi-automated mode may not include automated steering, for example, adaptive cruise control, where the operator controls steering and the automated system controls speed.

The vehicle 100 can have a manual mode. "Manual mode" means that all the navigation and/or maneuvering of the vehicle 100 along a travel route is performed by a human operator with minimal or no input from a computing system.

As an example, the manual mode can include Level 0 (L0), as defined by the SAE J3016 Standard. One example of the manual mode is when a lane departure warning system is engaged. In this case, the vehicle 100 does not respond to external events, such as other vehicles, lane markings, traffic signs, etc., but may issue a passive warning to a human operator when the vehicle 100 deviates from the centerline of the lane of travel by a predetermined value. The lane departure warning system is therefore not classifiable (other than at Level 0) under the SAE J3016 Standard.

In either case, the vehicle 100 includes a centering system 170 that is implemented to perform methods and other functions as disclosed herein relating to increasing the lane centering performance of an operator after transitioning from the automated to the manual mode, as shown in FIG. 1. Specifically, after transitioning from the automated mode (e.g., unmonitored automated mode, monitored automated mode, or semi-automated mode that includes automated steering) to the manual mode. Furthermore, a lane positioning system 180 is illustrated as an additional sub-component of the vehicle 100. However, it should be noted that while the centering system 170 is illustrated as a sub-component of the vehicle 100, in various embodiments, the centering system 170 is integrated with the lane positioning system 180 to adjust internal parameters and control the actions of the lane positioning system 180. Alternatively, in one embodiment, the centering system 170 is a separate system from the lane positioning system 180, as shown in FIG. 1, that can communicate with the lane positioning system 180 via a wired or wireless connection to correlate functionality as discussed herein.

Referring again to FIG. 1, the lane positioning system 180 may include one or more computing sub-systems capable of operating the vehicle 100 in various operating modes. For example, the lane positioning system 180 may include a lane centering system 182 capable of steering the vehicle 100 to remain within the current lane of travel. The lane centering system 182 acting independently or in combination with other systems (e.g., a system that provides acceleration/deceleration control) may be capable of operating the vehicle 100 in the unmonitored, the monitored and the semi-automated modes. The lane positioning system 180 may include a lane keeping assist system 184. The lane keeping assist system 184 may be capable of operating the vehicle 100 in the semi-automated mode by providing a small amount of counter-steering force, which steers the vehicle towards the centerline of the lane of travel. The lane positioning system 180 may include a lane departure warning system 186. As set forth above, the lane departure warning system 186 provides passive warnings to an operator when the vehicle 100 excessively deviates from the centerline of the lane of travel while operating in the manual mode. The noted functions and methods will become more apparent with a further discussion of the figures.

Figure 2:
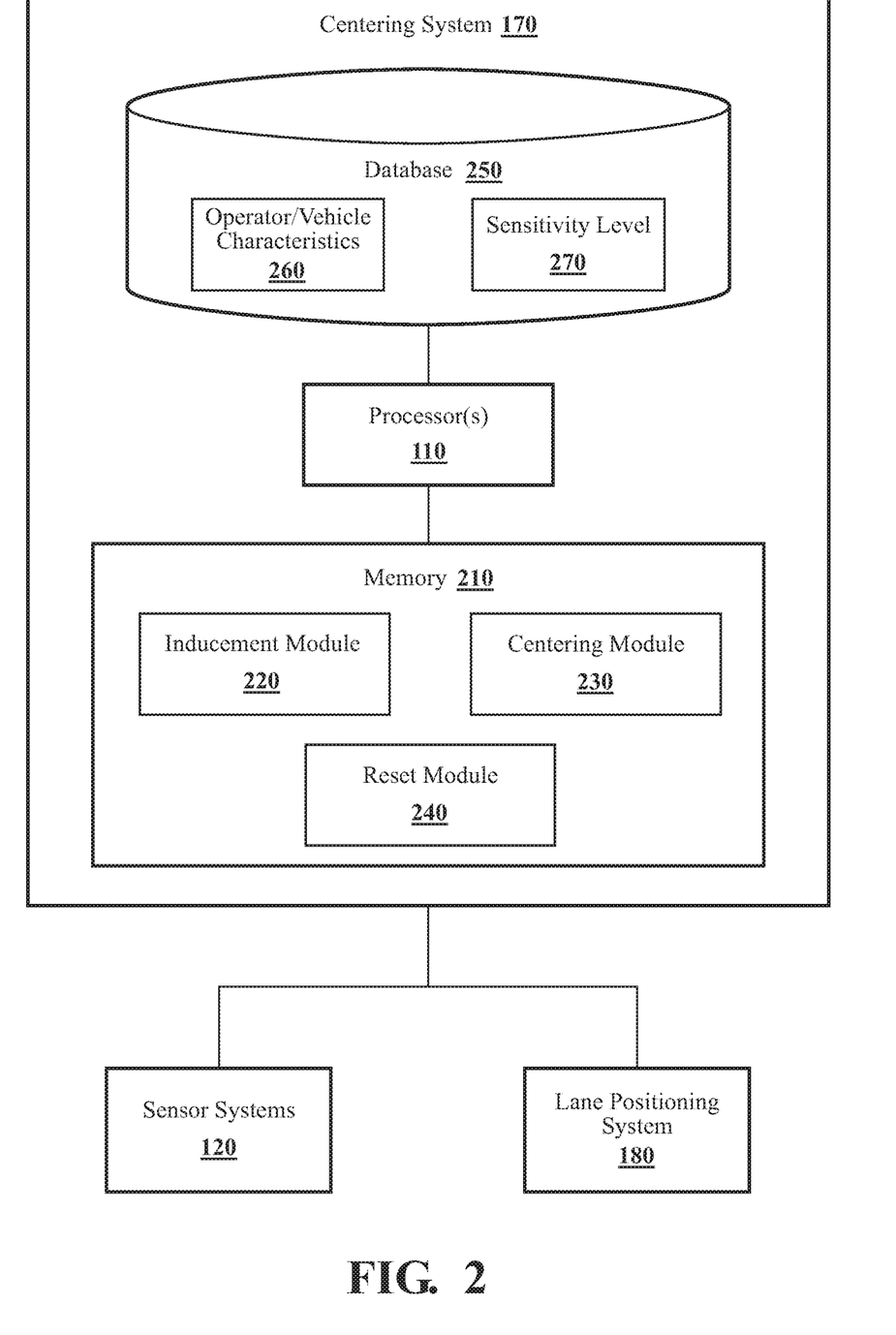
FIG. 2 illustrates one embodiment of a centering system that is associated with improving the lane centering performance of an operator of a vehicle.

With reference to FIG. 2, one embodiment of the centering system 170 of FIG. 1 is further illustrated. The centering system 170 is shown as including a processor 110 from the vehicle 100 of FIG. 1. Accordingly, the processor 110 may be a part of the centering system 170, the centering system 170 may include a separate processor from the processor 110 of the vehicle 100, or the centering system 170 may access the processor 110 through a data bus or another communication path. In one embodiment, the centering system 170 includes a memory 210 that stores an inducement module 220, a centering module 230, and a reset module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

With continued reference to FIG. 2, in one embodiment, the centering system 170 includes a database 250. The database 250 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 250 stores data used by the inducement module 220, the centering module 230 and the reset module 240 in executing various functions, as set forth below. In one embodiment, the database 250 includes an operator/vehicle characteristics 260 database and a sensitivity level 270 database, both of which are used by the modules 220, 230, and 240 of the centering system 170, as set forth below.

The lane positioning system 180, in one or more embodiments, includes a sensitivity level that is associated with assisting the operator to maintain the current lane position in the manual mode or in the semi-automated mode that does not include automated steering. The lane keeping assist system 184 and the lane departure warning system 186 may include the ability to modify the sensitivity level of the lane positioning system 180. The lane keeping assist system 184 may assist the operator to maintain the current lane position by providing a small amount of counter-steering force to urge the vehicle 100 towards the centerline of the current lane of travel. For example, the sensitivity level of the lane positioning system 180 may be modified with a higher sensitivity level value directed to the lane keeping assist system 184. Subsequently, this higher sensitivity level may cause the counter-steering force to be applied to the vehicle 100 at a shorter vehicle deviation distance, as described below, from the centerline. The lane departure warning system 186 may assist the operator to maintain the current lane position by generating a warning signal to alert the operator when the vehicle 100 excessively deviates from the centerline of the lane of travel. In one or more arrangements, the warning signal is at least one of audible, visual and haptic. For example, the sensitivity level of the lane positioning system 180 may be modified with a higher sensitivity level value directed to the lane departure warning system 186, which in turn would cause the warning signals to occur at a shorter vehicle deviation distance from the centerline. The lane positioning system 180 may include other subsystems not mentioned herein or developed in the future that have the ability to modify the sensitivity level of the lane positioning system 180.

Accordingly, the inducement module 220 includes instructions that function to control the processor 110 to modify a sensitivity level of the lane positioning system 180 from a first value to a second value to induce finer path following by the operator when a transition from the automated steering mode to the manual mode of vehicle operation is detected. To induce finer path following means, in one embodiment, to modify the sensitivity level of the lane positioning system 180 such that the operator's lane centering performance may be improved through assistance by the system 180. The continued assistance provided by the lane positioning system 180 may influence the operator toward a higher quality of lane centering performance. This may be accomplished, for example, by modifying a sensitivity setting of the lane keeping assist system 184. Additionally, or, in the alternative, for example, modifying a sensitivity setting of the lane departure warning system 186 may accomplish the inducement of a finer lane centering by the operator.

The transition from the automated mode (e.g., unmonitored automated mode, monitored automated mode or semi-automated mode including automated steering) to manual mode may occur as a result of various operations performed by the operator and/or the vehicle 100. For example, the transition from the automated mode to the manual mode may be due to the operator disengaging an automated control switch, the operator depressing the brake pedal, the operator taking control of the steering wheel to manually drive the vehicle 100, the vehicle 100 in automated mode determining that the conditions for automated mode are no longer being met and automatically changing the operating mode from the automated mode to the manual mode, etc. The above list is not exhaustive and there may be other conditions that would cause the transition.

The inducement module 220 may detect that the manual mode has been entered, in one arrangement, by receiving a manual mode signal representing that automated steering is deactivated. For example, one or more automated driving modules 160 (FIG. 1) may output the manual mode signal as a result of the conditions stated above or other conditions causing a transition from the automated mode that includes automated steering to the manual mode. The inducement module 220, in one approach, ignores a manual mode signal that represents the deactivation of an automated mode that does not include automated steering, e.g., adaptive cruise control.

The first value is, in one embodiment, a sensitivity level value that is set by the operator. For example, the first value is a sensitivity setting of the lane keeping assist system 184 and/or the lane departure warning system 186, which is electronically communicated via an input system 130 (FIG. 1) through activation of a button, touch display, etc., by the operator. The first value may be a default sensitivity level value set by the vehicle manufacturer. The first value may represent, for example, an operator desired sensitivity setting for the lane keeping assist system 184 and/or the lane departure warning system 186. The first value may be changed or set to the default sensitivity level value at any time by the operator. Furthermore, the first value may be applied to the lane positioning system 180 by the centering system 170, as set forth below.

The second value is a heightened sensitivity level value of the lane positioning system 180 that is used to induce finer path following by the operator. The inducement module 220, in one embodiment, calculates the second value according to characteristics of at least one of the operator and the vehicle 100. As set forth above, in one or more embodiments, the inducement module 220 computes the second value as a function of past lane centering performance of a specific operator in normal and adverse weather conditions, how long the vehicle 100 was in the automated mode including automated steering before transitioning to the manual mode and the age of the specific operator. The inducement module 220 may use other conditions or parameters not listed above to compute the second value, for example, past lane centering performance associated with the time of day, roadway conditions, e.g., construction, traffic volume, etc. Utilizing past lane centering performance related to the time of day may be indicative of various levels of alertness.

Figure 3:
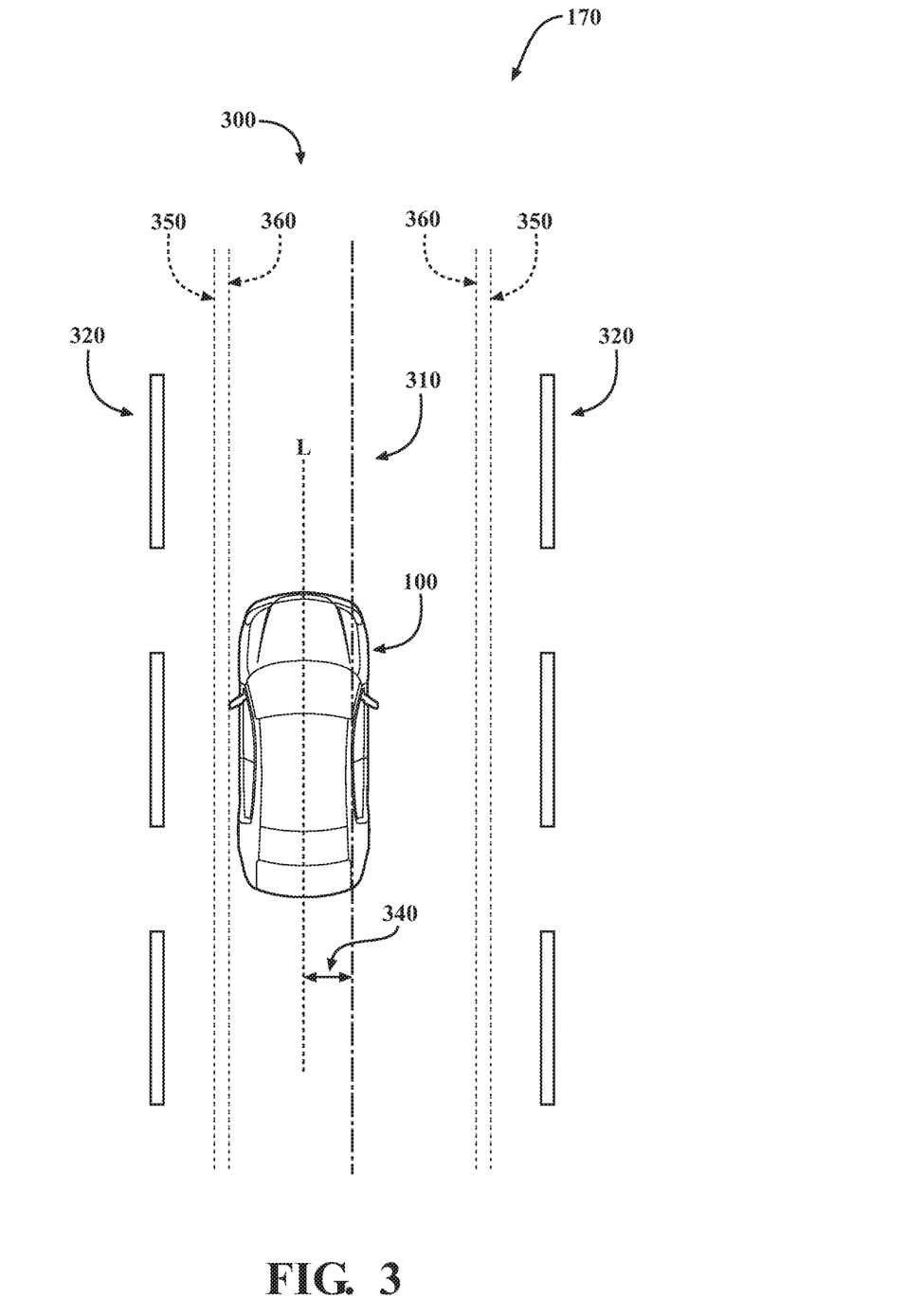
FIG. 3 illustrates the vehicle in a travel lane having a centerline and lane boundaries.

A metric for lane centering performance may be a deviation score. In one or more arrangements, the deviation score is a measure of the lane centering performance of the operator while in the manual mode. In other words, the deviation score characterizes deviations of the vehicle 100 from a centerline of a path of travel resulting from operator control inputs. The path may be a lane, an offset within a lane, a trajectory along a roadway not defined by lane markers, etc. The deviation score utilized by the centering system 170 may be defined by referring to FIG. 3. The vehicle 100 is shown in a travel lane 300 having a centerline 310 and lane boundaries 320. As shown in FIG. 3, the centerline 310 is a center of the travel lane 300, however, the centerline 310 may be the centerline of the path of travel, as set forth above. When in the manual mode, the vehicle 100 may deviate from the centerline 310. A deviation 340 is defined to be the distance between the longitudinal axis L of the vehicle 100 and the centerline 310.

Briefly referring to FIG. 1, the lane positioning system 180 and/or the inducement module 220 may determine the deviation 340 at any time. For example, the deviation 340 may be determined from processing forward-facing camera images stored as sensor data 119 captured by one or more cameras 126 of a sensor system 120 on-board the vehicle 100.

The deviation score may be determined from a maximum deviation observed in a predetermined time period, e.g., 1 minute, 30 seconds, etc., and/or a predetermined travel distance, e.g., one-mile, one-half mile, etc. As another example, the deviation score may be determined from an average value derived from the deviation 340 determinations sampled, e.g., every 1 second, every 2 seconds, etc., over the predetermined time period and/or the predetermined distance. As yet another example, the deviation score may be the number of times the vehicle 100 crosses the centerline 310 in the predetermined time period and/or the predetermined distance.

The deviation score may be determined from other measures that characterize deviations of the vehicle 100. For example, the determination of the deviation score may be based on the standard deviation of lane positions sampled over the predetermined time period and/or the predetermined distance, which is indicative of the amount of vehicle "weaving." The deviation score may be based on the steering wheel reversal rate, which is generally defined as the number, per minute, of steering wheel reversals. As another example, the deviation score may be based on steering entropy, which is a measure of randomness in an operator's steering control derived from the steering wheel angle.

In either case, the deviation score may be normalized, e.g., to a value between 0 and 10, expressed as a percentage, etc. The deviation score may be determined in any suitable manner, individually or in combination, that characterizes the deviations 340 of the vehicle 100 from the centerline 310 resulting from operator control inputs.

The inducement module 220 may use past deviation scores when determining the second value. The past deviation scores are indicative of the operator's lane centering performance for past trips or occurrences on the same trip. In one approach, the past deviation scores serve as a metric that informs the evaluation of the current lane centering performance of the operator. Because the past deviation scores serve as a baseline for the centering system 170, the inducement module 220, in one embodiment, at least semi-continuously updates the deviation scores when the centering system 170 is not actively controlling the lane positioning system 180. The inducement module 220 may store the past deviation scores as an operator characteristic in the operator/vehicle characteristics 260 database. The past deviation scores may be determined for each operator of the vehicle 100. Operator identification may be determined from the input system 130 using, for example, biometric devices such as a fingerprint receiver, a retinal scan device, face recognition camera, pattern inputs, etc. As mentioned above, the inducement module 220 may determine the deviation 340. Alternatively, the lane positioning system 180 may determine the deviation 340 and share the deviation 340 with the inducement module 220 via a wired or wireless interface.

The inducement module 220, in one arrangement, may use the past deviation scores that include the past deviation scores of the operator obtained during inclement weather conditions, roadway conditions (e.g., road construction, congested traffic, etc.), specific times of the day, etc., when determining the second value. The past deviation scores may be determined in the same manner as described above, however, the past deviation scores may be flagged as being determined during inclement weather conditions by the inducement module 220. The flagged deviation scores may be stored as an operator characteristic in the operator/vehicle characteristics 260 database. The inducement module 220 may determine the presence of inclement weather from a navigation system 147 (FIG. 1), roadway conditions from one or more environmental sensors 122 and/or any other suitable sensors of the sensor system 120.

In addition to the past deviation scores, the inducement module 220, in one embodiment, bases the calculation of the second value on how long the vehicle 100 was in the automated mode. This can include automated steering before transitioning to the manual mode. The lane centering performance, i.e., lateral control ability, in the manual mode may decrease as a function of how long the vehicle 100 had automated steering. An automated steering factor, which may be based on the automated steering duration prior to the most recent transition to the manual mode may be stored as a vehicle characteristic in the operator/vehicle characteristics 260 database.

The inducement module 220, in one arrangement, bases the calculation of the second value on the age of the operator. The lateral control ability of the operator after the vehicle 100 transitions from automated steering to manual mode may be a function of the age of the operator. Older operators may generally have better lane centering performance than younger operators, e.g., teenage operators. The age of the operator may be determined from the input system 130 using, for example, data input from the operator via a touch screen, a facial recognition camera trained to estimate the age of the operator, etc. The effect of the age of the operator on the second value determination may be phased out over time as the younger operator gains driving experience. Specifically, the inducement module 220 may track how long a specific operator has driven the vehicle 100 and reduce the effect of age based on, for example, how many miles the specific operator has driven. A driver age factor, which is based on the operator's age and/or the operator's experience may be stored as an operator characteristic in the operator/vehicle characteristics 260 database.

The inducement module 220, in one embodiment, calculates the second value according to characteristics of at least one of the operator characteristics and the vehicle characteristic as set forth above. The second value may incorporate other operator and/or vehicle characteristics not mentioned above. The inducement module 220 calculates the second value and modifies the sensitivity level of the lane position system 180 from the first value to the second value in response to detecting the transition from the automated mode including automated steering to the manual mode. Modifying the sensitivity level of the lane position system 180 to the second value means, for example, modifying the sensitivity settings of the lane keeping assist system 184 and/or the lane departure warning system 186 in accordance with the calculated second value.

The first value may be represented by the sensitivity settings of the lane keeping assist system 184 and/or the lane departure warning system 186 prior to the transition. The second value may be represented by the sensitivity settings of the lane keeping assist system 184 and/or the lane departure warning system 186 as calculated from the at least one of the operator and vehicle characteristics. The inducement module 220 may determine the first value from the sensitivity settings of the lane keeping assist system 184 and/or the lane departure warning system 186 and may store the first value in the sensitivity level 270 database prior to modifying the sensitivity level of the lane positioning system 180 to the second value. Further, the inducement module 220 may store the second value that is calculated after the transition in the sensitivity level 270 database.

The sensitivity level of the lane positioning system 180, in one or more embodiments, defines a threshold for the deviations 340 of the vehicle 100 from the centerline 310. The sensitivity level of the lane position system 180 set at the first value may be represented by a first sensitivity line 350, as shown in FIG. 3. The first sensitivity line 350 may be determined by the lane position system 180 from, for example, the sensitivity settings of the lane keeping assist system 184 and/or the lane departure warning system 186, i.e., the first value. When the centering system 170 is not active, the first sensitivity line 350 may be a lane boundary where the lane positioning system 180 controls the vehicle 100 when any portion of the vehicle 100 crosses the first sensitivity line 350. For example, the lane keeping assist system 184 may provide a small amount of counter-steering force to urge the vehicle 100 towards the centerline 310 when the first sensitivity line 350 is crossed. Alternatively, or in addition to, the lane departure warning system 186 may activate a warning to alert the operator that the first sensitivity line 350 has been crossed, i.e., the operator is excessively deviating from the centerline 310. The first sensitivity line 350 may be moved towards the centerline 310 making the lane positioning system 180 "more sensitive" to the deviations 340 of the vehicle 100 from the centerline 310 by adjusting the sensitivity settings of the lane keeping assist system 184 and/or the lane departure warning system 186. Likewise, the first sensitivity line 350 may be moved away from the centerline 310 making the lane positioning system 180 "less sensitive" to the deviations 340 of the vehicle 100 from the centerline 310.

The centering module 230 includes instructions that function to control the processor 110 to control the lane positioning system 180 according to the sensitivity level set at the second value. This facilitates maintaining a current lane position by the operator. The sensitivity level of the lane position system 180 set at the second value may be represented by a second sensitivity line 360, as shown in FIG. 3. The second sensitivity line 360 will be closer to the centerline 310 than the first sensitivity line 350, thus making the lane positioning system 180 more sensitive to the deviations 340 of the vehicle 100 from the centerline 310. In a few cases, the second sensitivity line 360 will overlay the first sensitivity line 350. In this case, for example, the sensitivity settings of the lane keeping assist system 184 and/or the lane departure warning system 186 are set with high sensitivity settings, which moves the first sensitivity line 350 closer to the centerline 310. The calculated second value may be associated with a second sensitivity line 360 that identically aligns with first sensitivity line 350. In no case would the second sensitivity line 360 be further away from the centerline 310 than the first sensitivity line 350.

The centering module 230, in one or more embodiments, controls the lane positioning system 180 when the vehicle crosses the second sensitivity line 360, i.e., when the vehicle exceeds the sensitivity level of the system 180 set at the second value. For example, the centering module 230 directs the second value to the sensitivity setting of the lane keeping assist system 184 to steer the vehicle 100 towards the centerline 310 when the second sensitivity line 360 is crossed. Alternatively, or in addition, for example, the centering module 230 directs the second value to the sensitivity setting of the lane departure warning system 186 to generate the warning signal to alert the operator of excessive lane deviations when the second sensitivity line 360 is crossed.

The reset module 240 includes instructions that function to control the processor 110 to reset the sensitivity level of the lane positioning system 180 to the first value upon determining that a current deviation score satisfies a stability threshold. When the stability threshold is satisfied, the reset module 240, in one embodiment, retrieves the first value from the sensitivity level 270 database and modifies the sensitivity level of the lane positioning system 180 back to the first value.

When resetting the sensitivity level from the second value to the first value, a transition may occur at a ramp time. The ramp time specifies a time over which the reset module 240 changes the sensitivity level from the second level to the first level. For example, the ramp time may be twenty seconds, thirty seconds, one minute, etc. The transition may be a linear transition from the second value to the first value such that intermediate values between the second value and the first value are applied in a linear manner over the ramp time. Referring to FIG. 3, if the ramp time is one minute, for example, values corresponding to a lines between the second sensitivity line 360 and the first sensitivity line 350 would be applied by the reset module 240 linearly from the start of the transition until the first value is reached at one minute.

For the operator to have satisfactory lane centering performance, the vehicle 100 should be maintained between the second sensitivity lines 360 while the centering system 170 is active. The reset module 240 calculates the current deviation score in a similar manner as described above for the past deviation score, including deviation scores taken during inclement weather conditions, roadway conditions (e.g., road construction, congested traffic, etc.), specific times of the day, etc. The reset module 240 may store the current deviation scores in the operator/vehicle characteristics 260 database and flag those current deviation scores that were calculated during these conditions. There may be conditions such that the current deviation score may exceed the past deviation score, but the vehicle 100 does not cross the second sensitivity lines 360. When comparing two deviation scores, a higher deviation score is interpreted as the operator having poorer lane centering performance abilities. For example, a higher current deviation score as compared to the past deviation score may be obtained from excessive centerline 310 crossings during the predetermined time period and/or the predetermined distance. As another example, the rate at which the vehicle 100 crosses the centerline 310 may tend to raise the current deviation score. There may be other lane centering performance conditions that cause the current deviation score to be greater than the past deviation scores.

The stability threshold may be satisfied, for example, when the current deviation score remains below a predetermined deviation score value for several predetermined time periods and/or predetermined distances, e.g., 10, 15, etc. As another example, the stability threshold may be satisfied when an average current deviation score remains below a predetermined deviation score value for several predetermined time periods and/or predetermined distances, e.g., 10, 15, etc. The predetermined deviation score value may be a deviation score that corresponds to a deviation 340 that places the vehicle 100 right at the point of contacting the second sensitivity line 360.

In one embodiment, the stability threshold may be modified according to a number of times the deviation 340 of the vehicle 100 from the centerline 310 exceeds the second sensitivity line 360. The stability threshold may be modified as a result of the reset module 240 detecting inclement weather conditions, roadway conditions, specific times of the day, etc. as set forth above, and may account for the current and past deviation scores that were obtained during these conditions. In another arrangement, the stability threshold may be satisfied by the current deviation score by simply the passage of a predetermined time-out period, e.g., 20 minutes, 30 minutes, etc., or a predetermined maximum distance, e.g., 20 miles, 30 miles, etc.

Figure 4:
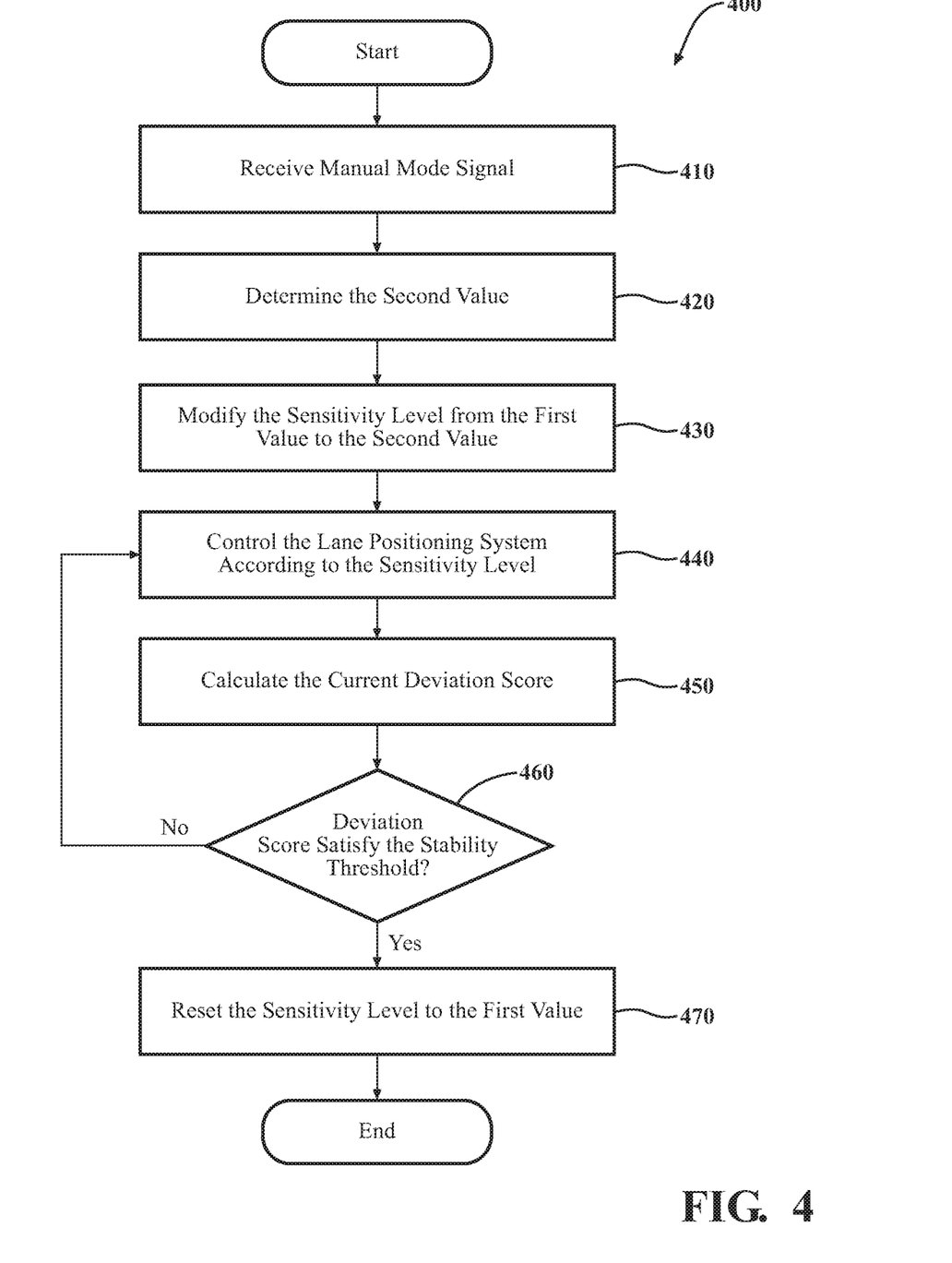
FIG. 4 is one example of a method that is associated with improving the lane centering performance of an operator.

FIG. 4 illustrates a flowchart of method 400 that is associated with improving the lane centering performance of an operator. Method 400 will be discussed from the perspective of centering system 170 of FIGS. 1-3. While method 400 is discussed in combination with the centering system 170, it should be understood that the method 400 is not limited to being implemented within the centering system 170, but is instead one example of a system that may implement the method 400. The steps that are illustrated herein as part of the method 400 are not limited to this particular chronological order. Indeed, some of the steps may be performed in a different order than what is shown and/or at least some of the steps shown can occur simultaneously.

As an initial matter, it should be noted that the inducement module 220 can at least semi-continuously acquire the deviation scores of the specific operators when the centering system 170 is not actively controlling the lane positioning system 180. The inducement module 220 stores the acquired deviation scores as past deviation scores for both normal driving and during inclement weather conditions, roadway conditions (e.g., road construction, congested traffic, etc.), specific times of the day, etc., in the operator/vehicle characteristics 260 database for the specific operator. This is, for example, a background operation that does not affect the operation of the lane positioning system 180. As another initial matter, in an event that the lane positioning system 180 is inactive, for example, then the centering system 170 may not be activated. This event may occur, for example, when both the lane keeping assist system 184 and the lane departure warning system 186 are inactive, i.e., both are turned off by the operator. However, the inducement module 220 may still actively collect past deviation scores as a background operation.

At block 410, the inducement module 220, in one or more arrangements, receives the manual mode signal representing that automated steering is deactivated. For example, one or more vehicle systems 140 (FIG. 1) and/or one or more automated driving modules 160 may output the manual mode signal in a wired or wireless fashion such that it is available to the inducement module 220. A manual mode signal representing that an automated mode not including automated steering is deactivated, e.g., semi-automated adaptive cruise control, would be ignored by the inducement module 220 and the method 400 would not proceed to block 420. Otherwise, the method may proceed to block 420.

At block 420, the inducement module calculates the second value to be applied to the sensitivity level of the lane positioning system 180 and may store the second value in the sensitivity level 270 database. As set forth above, in one or more embodiments, the second value may be based on calculations involving, e.g., past lane centering performance of a specific operator in normal and adverse weather conditions, roadway conditions, e.g., construction, congested traffic, etc., during specific times of the day. The second value may be based on how long the vehicle 100 was in the automated mode including automated steering before transitioning to the manual mode, the age of the specific operator and the driving experience of the operator. Once the second value is calculated, the method may proceed to block 430.

At block 430, the inducement module 220 may store the first value, as determined from the lane keeping assist system 184 and/or the lane departure warning system 186, in the sensitivity level 270 database. The inducement module 220 then modifies the sensitivity level of the lane positioning system 180 to the second value. Modifying the sensitivity level of the lane position system 180 to the second value means, for example, to modify the sensitivity settings of the lane keeping assist system 184 and/or the lane departure warning system 186 in accordance with the calculated second value. Once the sensitivity level has been modified to the second level, the method proceeds to block 440.

At block 440, the centering module 230 controls the lane positioning system 180 according to the sensitivity level set at the second value. If the deviation 340 of the vehicle 100 exceeds the second sensitivity line 360, i.e., the second value, the centering module 230 directs the second value to the sensitivity setting of the lane keeping assist system 184 and/or the sensitivity setting of the lane departure warning system 186 to appropriately control the system 180, as set forth above. Once the lane positioning system 180 is suitably controlled, if necessary, the method 400 may proceed to block 450

At block 450, the reset module 240 calculates the current deviation score, as set forth above. The reset module 240 may calculate current deviation scores that are higher, i.e., signifying poorer lane centering performance abilities, as compared to the past deviation scores for the specific operator. Even though an operator may have a relatively higher current deviation score as compared to the past deviation scores, the vehicle 100 may still fall between the second sensitivity lines 360. The reset module 240 may store the current deviation score in the operator/vehicle characteristics 260 database and the method 400 may proceed to block 460.

At block 460, the reset module 240 determines if the stability threshold has been satisfied. The stability threshold may be satisfied in various ways, as set forth above. The stability threshold may be modified due to inclement weather conditions, road conditions, time of day and/or the number of times the deviation 340 of the vehicle 100 from the centerline 310 exceeds the second sensitivity lines 360. If the current deviation score does not satisfy the stability threshold, the method 400 moves back to block 440. Otherwise, the method 400 proceeds to block 470.

At block 470, the reset module 240 retrieves the first value from the sensitivity level 270 database and modifies the sensitivity level of the lane positioning system 180 back to the first value. After the sensitivity level is modified to the first value, the method 400 is terminated.

Figure 5:
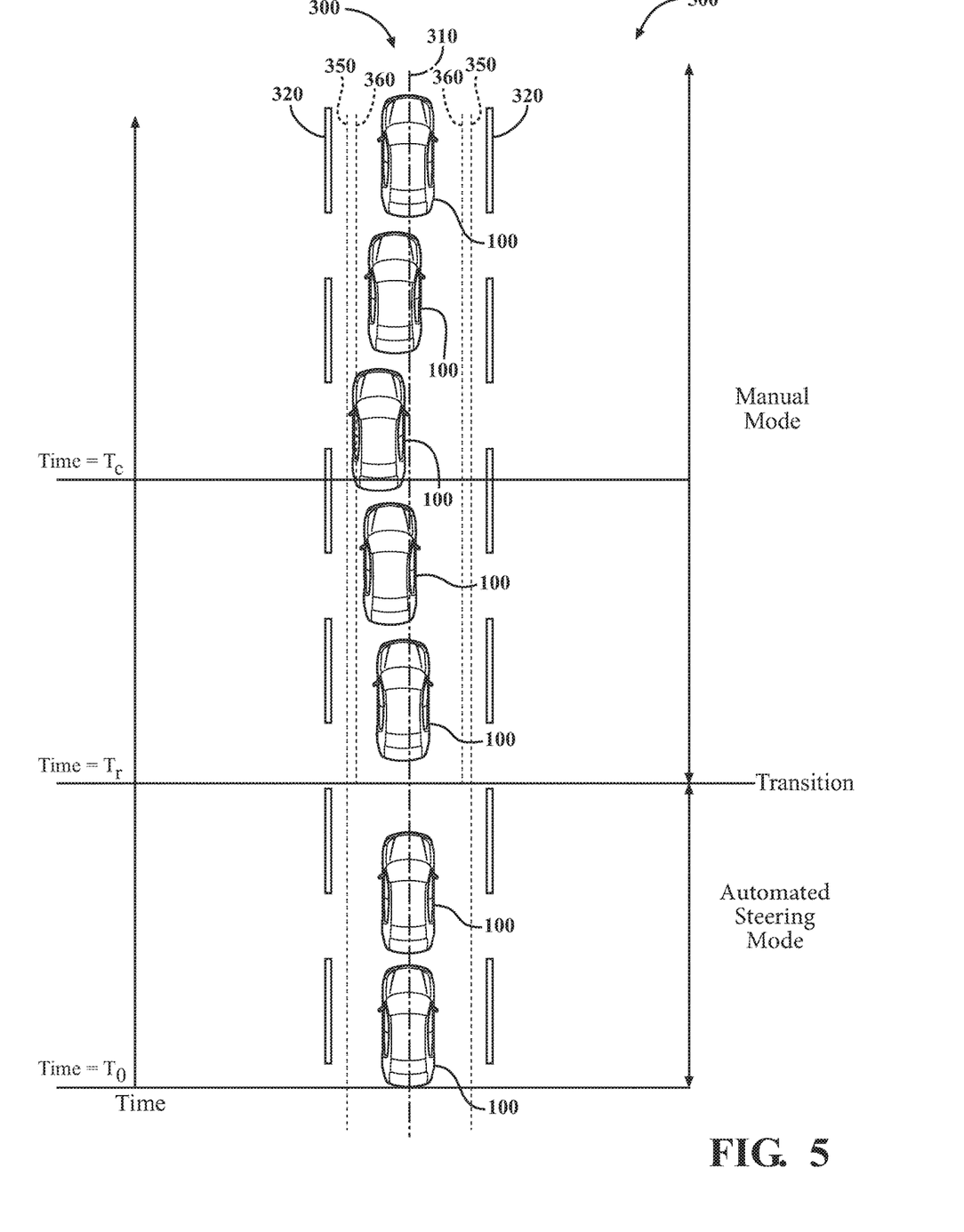
FIG. 5 is an example view of a vehicle traveling in time along a lane of travel.

As an example of how the centering system 170 can improve the lane centering performance of the operator, consider FIG. 5. FIG. 5 illustrates a top view 500 of the vehicle 100 traveling in time along the travel lane 300. At a time=$T_0$, the vehicle 100 is in the automated steering mode and traveling along the centerline 310. At a time=$T_r$, the operating mode of the vehicle 100 transitions from the automated steering mode to the manual mode, for example, the operator deactivated the automated mode by taking control of the steering wheel. The inducement module 220 calculates the second value, modifies the sensitivity level of the lane position system 180 to the second value and the second sensitivity lines 360 are established. The second value is applied to sensitivity settings of both the lane keeping assist system 184 and the lane departure warning system 186, as both systems were activated by the operator prior to entering the manual mode for this example. The operator begins to deviate from the centerline 310 towards the left lane boundary 320 as time progresses from time $T_r$ to $T_c$. At time=$T_c$, the vehicle 100 contacts the second sensitivity line 360. Once contacted, the centering module 230 controls the lane position system 180 by providing a small amount of counter-steering force to urge the vehicle 100 towards the centerline 310 of the current lane of travel. Also, the centering module 230 controls the lane positioning system 180 by activating the warning signal, e.g., a haptic vibration in the steering wheel, to alert the driver of excessive lane deviation. After time=$T_c$, both the vehicle 100 and the operator may steer the vehicle 100 towards the centerline 310, as shown in FIG. 5. At some time in the future (time>>$T_c$—not shown), the current deviation score as calculated by the reset module 240 may satisfy the stability threshold. At that time, the reset module 240 may apply the first value to the lane positioning system 180 and the centering system 170 will be deactivated. However, the inducement module 220 will continue to collect deviation scores, i.e., past deviation scores, in the background while the vehicle 100 is in manual mode.

FIG. 1 will now be discussed in full detail as an example vehicle environment within which the system and methods disclosed herein may operate. In some instances, the vehicle 100 is configured to switch selectively between an automated mode (e.g., unmonitored automated mode or monitored automated mode), one or more semi-automated operational modes, and/or a manual mode. Such switching also referred to as handover when transitioning to a manual mode can be implemented in a suitable manner, now known or later developed.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include the sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which an automated vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or the one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include the input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or the navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the centering system 170, and/or the automated driving module(s) 160 can be operably connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the centering system 170, and/or the automated driving module(s) 160 may control some or all of these vehicle systems 140 and, thus, may be partially or fully automated.

The processor(s) 110, the centering system 170, and/or the automated driving module(s) 160 can be operably connected to communicate with the various vehicle systems 140 and/or individual components thereof. For example, returning to FIG. 1, the processor(s) 110, the centering system 170, and/or the automated driving module(s) 160 can be in communication to send and/or receive information from the various vehicle systems 140 to control the movement, speed, maneuvering, heading, direction, etc. of the vehicle 100. The processor(s) 110, the centering system 170, and/or the automated driving module(s) 160 may control some or all of these vehicle systems 140.

The processor(s) 110, the centering system 170, and/or the automated driving module(s) 160 may be operable to control the navigation and/or maneuvering of the vehicle 100 by controlling one or more of the vehicle systems 140 and/or components thereof. For instance, when operating in an automated mode, the processor(s) 110, and/or the automated driving module(s) 160 can control the direction and/or speed of the vehicle 100. The processor(s) 110, the centering system 170 and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by the processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current automated driving maneuvers for the vehicle 100, future automated driving maneuvers and/or modifications to current automated driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A centering system for improving lane centering performance of an operator of a vehicle after transitioning from an automated mode of operation to a manual mode of operation, comprising:
   one or more processors;
   a memory communicably coupled to the one or more processors and storing:
   an inducement module including instructions that when executed by the one or more processors cause the one or more processors to modify in response to detecting a transition to the manual mode of operation, a sensitivity level of a lane positioning system from a first value to a second value, the second value causing the lane positioning system to apply a counter-steering force to the vehicle at a deviation distance shorter than another deviation distance associated with the first value, wherein the deviation distance is a distance between a center of a lane and a center of the vehicle;
   a centering module including instructions that when executed by the one or more processors cause the one or more processors to control the lane positioning system according to the sensitivity level; and
   a reset module including instructions that when executed by the one or more processors cause the one or more processors to reset the sensitivity level to the first value upon determining that a deviation score satisfies a stability threshold, wherein the deviation score characterizes deviations of the vehicle from a centerline resulting from operator control inputs.

2. The centering system of claim 1, wherein the inducement module further includes instructions to calculate the second value according to characteristics of at least one of the operator or the vehicle, wherein the characteristics include one or more of past deviation scores of the operator, a time operating in the automated mode, an age of the operator, or a driving experience of the operator, and wherein the sensitivity level defines a threshold for the deviations of the vehicle from the centerline.

3. The centering system of claim 2, wherein the past deviation scores include the past deviation scores of the operator associated with at least one of inclement weather conditions, road conditions, or a time of day.

4. The centering system of claim 1, wherein the centering module further includes instructions to control the vehicle to steer towards the centerline when the deviations exceed the sensitivity level.

5. The centering system of claim 1, wherein the centering module further includes instructions to generate a warning signal to alert the operator when the deviations exceed the sensitivity level, and wherein the warning signal is at least one of audible, visual or haptic.

6. The centering system of claim 1, wherein the inducement module further includes instructions to receive a signal that indicates the transition is from the automated mode and into the manual mode.

7. The centering system of claim 1, wherein the reset module further includes instructions to modify the stability threshold according to a number of times the deviations exceed the sensitivity level.

8. The centering system of claim 1, wherein the reset module further includes instructions to retrieve the first value from the memory and modify the sensitivity level of the lane positioning system to the first value.

9. A method for improving lane centering performance of an operator of a vehicle after transitioning from an automated mode of operation to a manual mode of operation, comprising:
in response to detecting a transition to the manual mode of operation, modifying a sensitivity level of a lane positioning system from a first value to a second value, the second value causing the lane positioning system to apply a counter-steering force to the vehicle at a deviation distance shorter than another deviation distance associated with the first value, wherein the deviation distance is a distance between a center of a lane and a center of the vehicle;
controlling the lane positioning system according to the sensitivity level; and
resetting the sensitivity level to the first value upon determining that a deviation score satisfies a stability threshold, wherein the deviation score characterizes deviations of the vehicle from a centerline resulting from operator control inputs.

10. The method of claim 9, further comprising calculating the second value according to characteristics of at least one of the operator or the vehicle, wherein the characteristics include one or more of past deviation scores of the operator, a time operating in the automated mode, an age of the operator, or a driving experience of the operator, and wherein the sensitivity level defines a threshold for the deviations of the vehicle from the centerline.

11. The method of claim 10, wherein the past deviation scores include the past deviation scores of the operator associated with at least one of inclement weather conditions, road conditions, or a time of day.

12. The method of claim 9, wherein the controlling the lane positioning system includes controlling the vehicle to steer towards the centerline when the deviations exceed the sensitivity level.

13. The method of claim 9, wherein the controlling the lane positioning system includes generating a warning signal to alert the operator when the deviations exceed the sensitivity level, and wherein the warning signal is at least one of audible, visual or haptic.

14. The method of claim 9, wherein the detecting the transition includes receiving a signal that indicates the transition is from the automated mode and into the manual mode.

15. The method of claim 9, further comprising modifying the stability threshold according to a number of times the deviations exceed the sensitivity level.

16. The method of claim 9, wherein the resetting the sensitivity level to the first value includes retrieving the first value from a memory and modifying the sensitivity level of the lane positioning system to the first value.

17. A non-transitory computer-readable medium for improving lane centering performance of an operator of a vehicle after transitioning from an automated mode of operation to a manual mode of operation and storing instructions that when executed by one or more processor cause the one or more processors to:
in response to detecting a transition to the manual mode of operation, modify a sensitivity level of a lane positioning system from a first value to a second value, the second value causing the lane positioning system to apply a counter-steering force to the vehicle at a deviation distance shorter than another deviation distance associated with the first value, wherein the deviation distance is a distance between a center of a lane and a center of the vehicle;
control the lane positioning system according to the sensitivity level; and
reset the sensitivity level to the first value upon determining that a deviation score satisfies a stability threshold, wherein the deviation score characterizes deviations of the vehicle from a centerline resulting from operator control inputs.

18. The non-transitory computer-readable medium of claim 17, wherein the computer-readable medium further includes instructions that when executed by the one or more processors cause the one or more processors to:
calculate the second value according to characteristics of at least one of the operator or the vehicle, wherein the characteristics include one or more of past deviation scores of the operator, a time operating in the automated mode, an age of the operator, or a driving experience of the operator, and wherein the sensitivity level defines a threshold for the deviations of the vehicle from the centerline.

19. The non-transitory computer-readable medium of claim 17, wherein the computer-readable medium further includes instructions that when executed by the one or more processors cause the one or more processors to:
control the vehicle to steer towards the centerline when the deviations exceed the sensitivity level.

20. The non-transitory computer-readable medium of claim 17, wherein the computer-readable medium further includes instructions that when executed by the one or more processors cause the one or more processors to:
generate a warning signal to alert the operator when the deviations exceed the sensitivity level, and wherein the warning signal is at least one of audible, visual or haptic.

21. The method of claim 9, wherein the second value is determined based at least in part on past lane centering performance of the operator associated with a time of day.

* * * * *